US007894335B2

(12) United States Patent
May

(10) Patent No.: US 7,894,335 B2
(45) Date of Patent: Feb. 22, 2011

(54) REDUNDANT ROUTING CAPABILITIES FOR A NETWORK NODE CLUSTER

(75) Inventor: Robert May, Vancouver (CA)

(73) Assignee: IP Infusion, Inc., San Jose, CA (US)

( * ) Notice: Subject to any disclaimer, the term of this patent is extended or adjusted under 35 U.S.C. 154(b) by 732 days.

(21) Appl. No.: 10/966,367

(22) Filed: Oct. 15, 2004

(65) Prior Publication Data

US 2005/0135233 A1   Jun. 23, 2005

Related U.S. Application Data

(63) Continuation-in-part of application No. 10/687,955, filed on Oct. 17, 2003.

(51) Int. Cl.
*H04J 1/16* (2006.01)
(52) U.S. Cl. .................. 370/219; 370/216; 370/238; 370/242
(58) Field of Classification Search ............... 370/389, 370/238, 386, 216, 219, 242; 714/4, 12
See application file for complete search history.

(56) References Cited

U.S. PATENT DOCUMENTS

| | | | | |
|---|---|---|---|---|
| 6,078,957 | A * | 6/2000 | Adelman et al. | 709/224 |
| 6,148,410 | A | 11/2000 | Baskey et al. | |
| 6,190,148 | B1 | 2/2001 | Ni | |
| 6,876,625 | B1 | 4/2005 | McAllister et al. | |
| 6,910,148 | B1 * | 6/2005 | Ho et al. | 714/4 |
| 6,928,589 | B1 * | 8/2005 | Pomaranski et al. | 714/47 |
| 6,938,078 | B1 * | 8/2005 | Yamada | 709/220 |
| 6,944,785 | B2 * | 9/2005 | Gadir et al. | 714/4 |
| 6,983,294 | B2 * | 1/2006 | Jones et al. | 707/202 |
| 7,126,921 | B2 | 10/2006 | Mark et al. | |
| 7,130,304 | B1 * | 10/2006 | Aggarwal | 370/389 |

(Continued)

FOREIGN PATENT DOCUMENTS

EP    1331772 A1    7/2003

(Continued)

OTHER PUBLICATIONS

Moy J. et al.; "Hitless OSPF Restart"; Aug. 2001; Network Working Group; pp. 1-13.*

(Continued)

*Primary Examiner*—Ricky Ngo
*Assistant Examiner*—Dewanda Samuel
(74) *Attorney, Agent, or Firm*—Nixon Peabody LLP

(57) ABSTRACT

Graceful/hitless restart features from a routing/signaling protocol may be utilized along with synchronization between cluster members in order to provide routing capabilities in a clustering environment. During normal operation, the active cluster member may operate the routing protocol(s) and communicate with the neighboring components using the cluster's address. As the active member learns the routes to the destinations, the routing data may be propagated to the stand-by cluster members across an internal communication mechanism. Configuration information for the routing component may also be propagated to the stand-by cluster members. Upon failure of the active routing component, the standby routing component may be started up such that neighboring routing components located outside of said cluster do not recalculate network topology based on said failure. This allows for failover to occur without affecting neighboring components and unduly burdening the system.

5 Claims, 4 Drawing Sheets

U.S. PATENT DOCUMENTS

| | | | |
|---|---|---|---|
| 7,181,567 B2 * | 2/2007 | Krishnan | 711/108 |
| 7,236,453 B2 * | 6/2007 | Visser et al. | 370/219 |
| 7,292,535 B2 * | 11/2007 | Folkes et al. | 370/238 |
| 7,317,731 B2 * | 1/2008 | Seddigh et al. | 370/419 |
| 7,359,377 B1 * | 4/2008 | Kompella et al. | 370/389 |
| 7,490,161 B2 * | 2/2009 | Ren | 709/238 |
| 2002/0049859 A1 | 4/2002 | Bruckert et al. | |
| 2002/0169794 A1 | 11/2002 | Jones et al. | |
| 2002/0176355 A1 | 11/2002 | Mimms et al. | 370/216 |
| 2002/0191547 A1 | 12/2002 | Akyol et al. | |
| 2003/0056138 A1 * | 3/2003 | Ren | 714/4 |
| 2003/0140155 A1 * | 7/2003 | Harvey et al. | 709/230 |
| 2003/0140156 A1 | 7/2003 | Karim | |
| 2003/0140167 A1 | 7/2003 | Harvey | |
| 2003/0154431 A1 | 8/2003 | Lin et al. | |
| 2003/0198182 A1 | 10/2003 | Pegrum et al. | 370/225 |
| 2003/0218982 A1 * | 11/2003 | Folkes et al. | 370/238 |
| 2004/0001485 A1 * | 1/2004 | Frick et al. | 370/389 |
| 2004/0008700 A1 | 1/2004 | Visset et al. | 370/401 |
| 2004/0049859 A1 | 3/2004 | Lang et al. | |
| 2004/0059830 A1 * | 3/2004 | Brown | 709/238 |
| 2004/0090913 A1 | 5/2004 | Scudder et al. | 370/219 |
| 2004/0098490 A1 | 5/2004 | Dinker et al. | |
| 2004/0260825 A1 | 12/2004 | Agarwal et al. | 709/230 |
| 2005/0050136 A1 * | 3/2005 | Golla | 709/200 |
| 2005/0265346 A1 | 12/2005 | Ho et al. | 709/239 |
| 2006/0053231 A1 | 3/2006 | Lange et al. | |

FOREIGN PATENT DOCUMENTS

| | | | |
|---|---|---|---|
| JP | 2002135328 A | 5/2002 | |

OTHER PUBLICATIONS

Moy, J.;"Hitless OSPF Restart";Feb. 2001;Network Working Group;pp. 1-10.*

Sangli, Srihari R., et al., "Graceful Restart Mechanism for BGP", *IETF, Network Working Group*, Chapter 3, 6, (Jul. 31, 2003), Retrieved from the Internet: URL: http://www.ietf.org/proceedings/03mar/I-D/draft-ietf-idr-restart-06.txt>.

International Search Report dated Jan. 27, 2005, PCT/US2004/034255.

Office Action for U.S. Appl. No. 10/687,955, mailed Jun. 8, 2007.

Office Action for U.S. Appl. No. 10/687,955, mailed Feb. 5, 2008.

Office Action for U.S. Appl. No. 10/687,955, mailed Sep. 18, 2008.

Office Action for U.S. Appl. No. 10/687,955, mailed May 27, 2009.

Moy, J., "Hitless OSPF Restart" Sycamore Networks, Inc., Aug. 2001, pp. 1-13.

Office Action in U.S. Appl. No. 10/687,955, mailed Mar. 16, 2010.

* cited by examiner

REDUNDANT ROUTING CAPABILITIES FOR A NETWORK NODE CLUSTER

CROSS-REFERENCE TO RELATED APPLICATION

This application is a continuation-in-part of co-pending U.S. patent application Ser. No. 10/687,955, entitled "System and Method For Providing Redundant Routing Capabilities For a Network Node" by Robert May, filed on Oct. 17, 2003, hereby fully incorporated by reference.

FIELD OF THE INVENTION

The present invention is directed to networking technology. In particular, the invention is directed to providing a backup routing service to a group of computing devices located within a logical space.

BACKGROUND OF THE INVENTION

In order to achieve high availability, many services or applications operate within a clustering environment, such that multiple independent devices operate in parallel. If a failure occurs on one device, this allows there to be a secondary service to take over the responsibility of the failed device. FIG. 1 is a diagram illustrating an example of a cluster. As can be seen, there are two cluster members (devices 100, 102), and two networks connected to the cluster (networks 104 and 106). In practice, there can be any number of cluster members and networks.

The clustering environment can be configured in many different ways, including active/stand-by, load sharing, or load balancing topology, depending upon the network or application requirements. Devices within the cluster are connected using some internal mechanism, and communication between cluster members may be available. However, even if it is not, the cluster entity is capable of recognizing a failure of a member and taking appropriate action.

Logically, the cluster is represented as a single entity to the outside world, which in the case of networking includes the attached networks. Neighboring devices "see" only a single entity (the cluster), with which they communicate. This permits the neighbors to be unaware of a failure, because characteristics such as IP address belong to the cluster, not the individual (failed) devices that make up the cluster.

Many types of applications and services that use clustering also require routing in their networks. As a result, it is necessary to add routing capability for the cluster itself, so that the applications or services have the necessary information (e.g., routes) to operate properly within the network.

Dynamic routing occurs when routing components talk to adjacent routing components, informing each other to which network each routing component is currently connected. The routing components must communicate using a routing protocol that is running by an application instantiating the routing function, or a routing daemon. In contrast to a static protocol, the information placed into the routing tables is added and deleted dynamically by the routing daemon as the routes in the system change over time. Additionally, other changes can occur to the routing information over time. For example, route preferences can change due to changes in network conditions such as delays, route addition/deletions, and network reachability issues.

Open Shortest Path First (OSPF) is a link-state protocol that implements dynamic routing on routing components. In a link-state protocol, each routing component actively tests the status of its link to each of its neighbors, and sends this information to its other neighbors. This process is repeated for all the routing components for nodes in the network.

Each routing component takes this link-state information and builds a complete routing table. This method can be used to quickly implement a dynamic routing system, especially in the case of changes in the links in the network.

The clustering environment imposes some limitations on the routing and/or signaling protocols used by the cluster to communicate with the neighboring devices. First, the protocols must communicate with the attached networks using the cluster addressing scheme. Private addresses assigned to the individual devices that make up the cluster must not be shared outside the cluster. Second, since neighboring devices know of only a single entity (the cluster), only one member within the cluster may be performing route exchange with neighbors at any given time (using the cluster address). If multiple devices attempt to communicate externally using the same addresses, network problems will result.

One solution that has been proposed is for the clustering environment to use protocol synchronization to synchronize the data structures and all internal data from each routing protocol on the active device to the backup device(s). The idea is that during a failure, the backup routing protocol can come online and begin communication with the neighboring devices as if nothing has occurred. The only real advantage to this solution is that traditionally, legacy high availability (HA) is achieved by mirroring the primary to the backup device in every way. Therefore, users who are familiar with traditional HA and not familiar with routing may feel comfortable with this solution. The disadvantage, however, is that it is a very complex, problematic, and unpredictable solution that has high impact to the cluster members and the internal cluster network. Since routing/signaling protocols were not designed to run in this way, the feasibility of this design is suspect. More importantly, however, in this solution the neighboring routing devices detect the failure of the active routing device, and subsequently rebuild their routing tables with the new information, which is hardly a seamless transition. In large networks, the number of neighboring devices and sizes of their routing tables are quite high, therefore adding significant burden on the network during a failover scenario.

Another solution that has been proposed is to introduce a high-end router to the cluster that can support equal-cost load balancing. The new cluster router (CR) is responsible for performing all routing communications with external network devices on behalf of the cluster addresses. Each cluster member runs standard OSPF to facilitate route exchange with the CR. The CR performs equal-cost load balancing across all of the cluster members. The cost and complexity of this solution, however, are both quite high. Additionally, the CR represents a single point of failure that places network functioning at risk.

What is needed is a solution that provides routing capabilities in a clustering environment in an efficient and effective manner.

BRIEF DESCRIPTION OF THE INVENTION

Graceful/hitless restart features from a routing/signaling protocol may be utilized along with synchronization between cluster members in order to provide routing capabilities in a clustering environment. During normal operation, the active cluster member may operate the routing protocol(s) and communicate with the neighboring components using the cluster's address. As the active member learns the routes to the destinations, the routing data may be propagated to the stand-by cluster members across an internal communication mechanism. Configuration information for the routing component may also be propagated to the stand-by cluster members. Upon failure of the active routing component, the standby routing component may be started up such that neighboring routing components located outside of said cluster do not recalculate network topology based on said failure. This allows for failover to occur without affecting neighboring components and unduly burdening the system.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
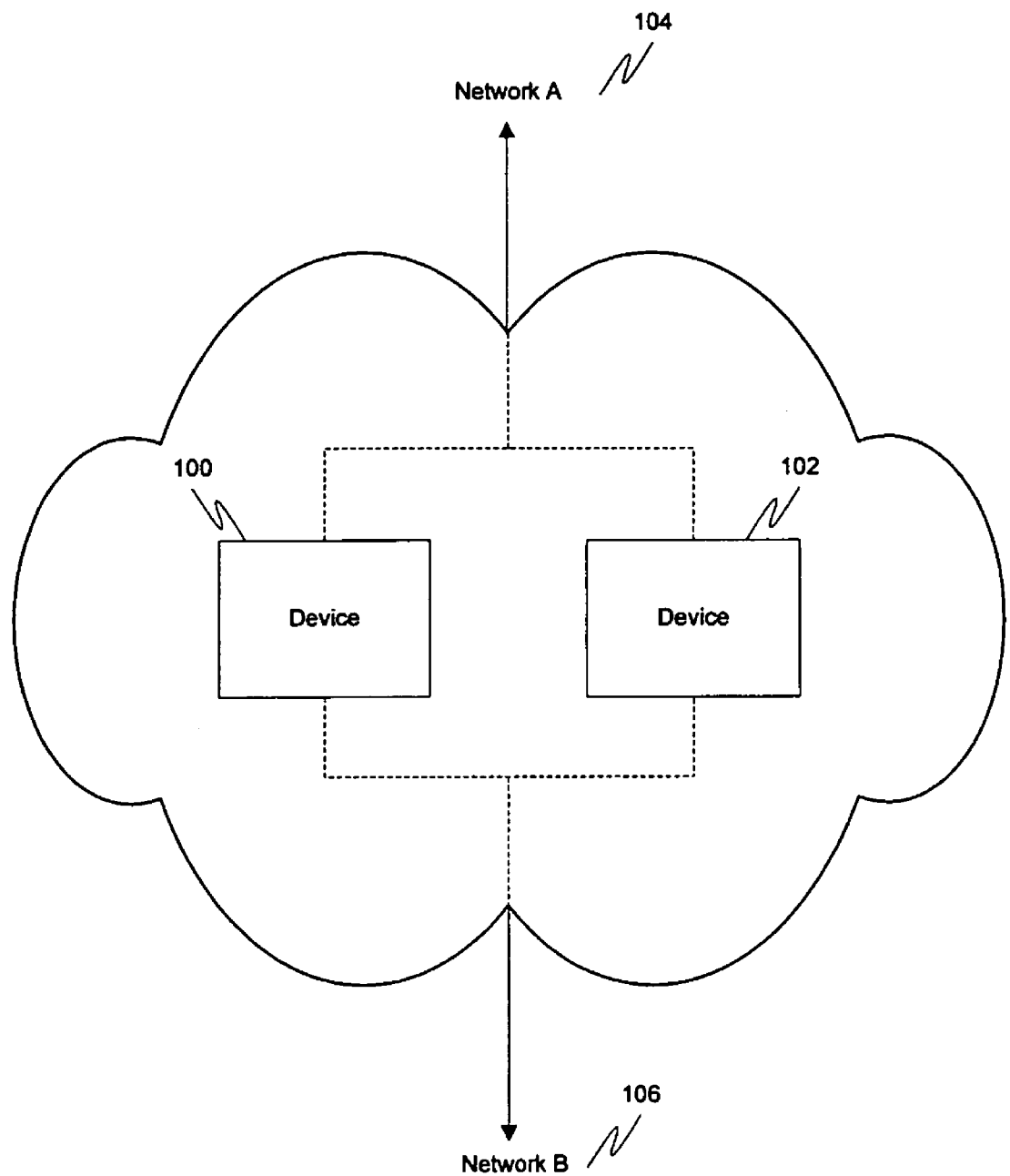
FIG. 1 is a diagram illustrating an example of a cluster.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present invention utilizes the graceful/hitless restart features common in routing/signaling protocols along with synchronization between cluster members in order to provide routing capabilities in a clustering environment. During normal operation, the active cluster member may operate the routing protocol(s) and communicate with the neighboring devices using the cluster's address. As the active member learns the routes to the destinations, the routes may be propagated to the stand-by cluster members across an internal communication mechanism. The route propagation may be performed as a centralized process or task that is external to the individual routing protocols. This external process is then responsible to propagate all the routing information, typically in the form of a Route Information Base (RIB) and/or Forwarding Information Base (FIB), as well as any other information needed for the graceful/hitless restart of the routing protocols to the cluster members.

Through this solution, all configuration commands and data may be propagated to all cluster members, ensuring that all members are able to communicate with the external devices in the same way. During failure of the active member, the routing protocols may be started on the stand-by devices using graceful/hitless restart capabilities. These features permit the router to restart without impacting the network topology, and neighboring devices may continue to forward packets to the cluster. Since the stand-by member has previously learned all discovered routes, it is able to continue forwarding packets while the protocols are restarting.

Generally, any routing/signaling protocol that supports the graceful/hitless restart feature or does not require such an extension due to the protocol's inherent functionality may be utilized. However, in one embodiment of the present invention, the OSPF protocol may be used. For purposes of this document, the solution provided herein may be referred to as the Cluster Routing Extension (CRX).

During normal operation, OSPF may communicate with neighbors and learn the network topology. Then, the CRX may synchronize dynamic data from the active to the stand-by member(s) of the cluster. This operation ensures that the kernel forwarding tables are synchronized across the cluster members. Upon failover, the stand-by device will have all the routes necessary to forward packets. Through this, CRX may synchronize all RIB (and FIB) routes from the active to the stand-by NSM. CRX may then synchronize all data required for graceful/hitless restart of active protocol(s) via a Network Service Module (NSM). CRX may synchronize static and dynamic configuration changes from the active to the stand-by member(s) to ensure that the stand-by device has identical configuration information as the failed device.

Unpredicted failures are the most critical type of failure to impact a network, and are the main reason companies deploy clustering. During failover, the neighboring routers must be able to continue to forward packets to the cluster and the new active member must be able to forward these packets to all destinations previously reachable by the failed node. These requirements may be met using an RIB synchronization feature of the CRX to synchronize all routing information, and by the protocol graceful/hitless restart capabilities that prevent topology re-calculation. Upon failover, either planned or unplanned, the stand-by OSPF may start up and go through a graceful restart period with its neighbors. The neighbor routers continue to announce the restarting router in their Link-State Advertisement as if it were fully adjacent, thus causing no disruption to the network until OSPF is fully restarted. Since the stand-by has a synchronized RIB/FIB from the primary, all packets continue to flow through the cluster without disruption.

During a planned downtime, the active router in the cluster knows ahead of time that a transition will occur, and can therefore prepare the neighboring routers for the event. The basic operation may then be for the OSPF router to send a special message to inform the neighbors of the downtime before shutting down. Since the neighbors know that the OSPF router is going down and will come back, they need not perform re-calculation of the network topology and eliminate the restarting router.

During an unplanned failure, the active router is obviously unable to inform the neighbors of the restart event. However, when the protocol is restarting, it may acquire enough information from the NSM to determine both that it is a graceful startup and whether or not it was a planned restart. If it was unplanned, then the restarting router may inform the neighbors of the restart even so they will not perform re-calculation of the network topology.

CRX may be thought of as having three logical components. First, a dynamic synchronization component may be used to synchronize the RIB, which also implicitly synchronizes the FIB, between the active and stand-by member(s). During failure, the new active member may retains all RIB/FIB routes for a timeout period. The timeout may be a configurable timer, or built into the restart capability of the routing protocols. This component also may synchronize any data required for correct operation of the protocol graceful/hitless restart operation.

Second, a configuration synchronization component may be used to synchronize all dynamic and static configuration information from the active to the stand-by members. Commands executed on the active member may be executed on the stand-by member(s) in parallel. For components that are active on both members, this is straight-forward. However, for protocol components that are started on the stand-by member during failover, the device should maintain up-to-date configuration information regarding the active member for each such protocol. Upon failover, the starting protocol(s) may be configured identically to the previously active protocols on the failed device.

Third, an operation/control component may specify the timing and sequencing for operation of the CRX design, including which protocols are active on which cluster members, the order they are started, etc. This component also specifies how protocols should operate, such as defining graceful/hitless restart requirements. This component may also form the integration point between the invention and the individual cluster member on which it operates.

Figure 2:
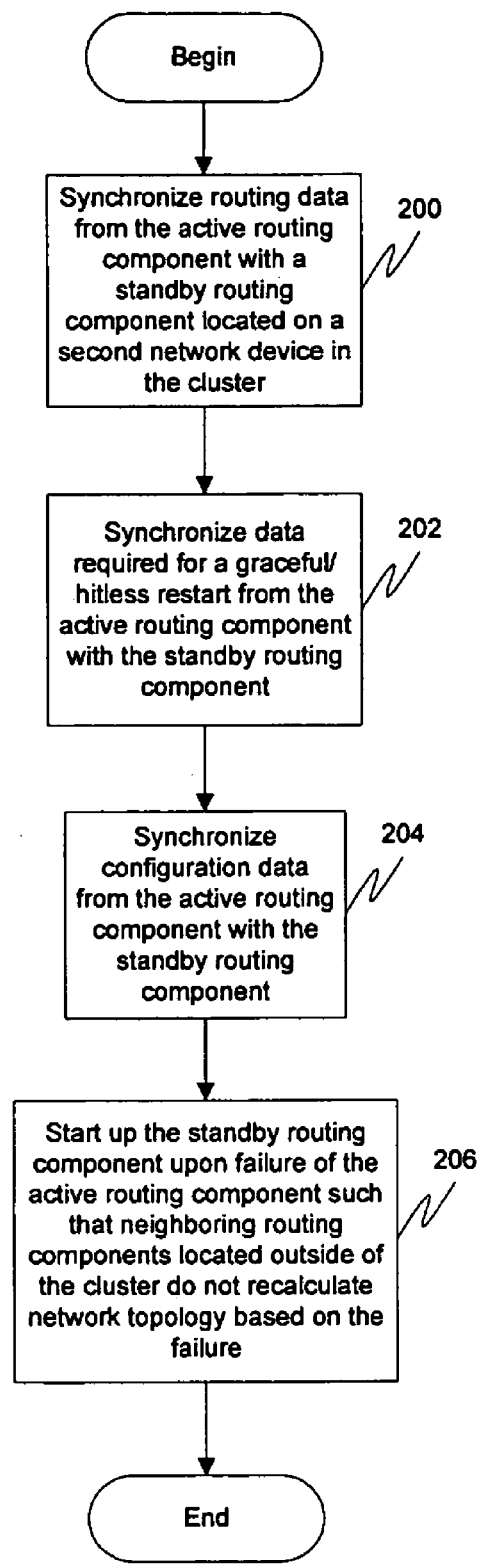
FIG. 2 is a flow diagram illustrating a method for handling a failure of an active routing component in accordance with an embodiment of the present invention.

FIG. 2 is a flow diagram illustrating a method for handling a failure of an active routing component in accordance with an embodiment of the present invention. Each act in this method may be performed in software, hardware, or any combination thereof. The active routing component may be located on a first network device in a cluster of network devices. At 200, routing data from the active routing component may be synchronized with a standby routing component located on a second network device in the cluster. This data may include an RIB and/or an FIB. At 202, data required for a graceful/hitless restart from the active routing component may be synchronized with the standby routing component. At 204, configuration data from the active routing component may be synchronized with the standby routing component. This may include both dynamic and static configuration data. At 206, upon failure of the active routing component, the standby routing component may be started up such that neighboring routing components located outside of the cluster do not recalculate network topology based upon the failure. This may include performing a graceful/hitless restart. This may also include sending a special message to the neighboring routing components to inform them of the failure. It should be noted that this sending of the special message may occur before the failure, if the failure is predicted.

Figure 3:
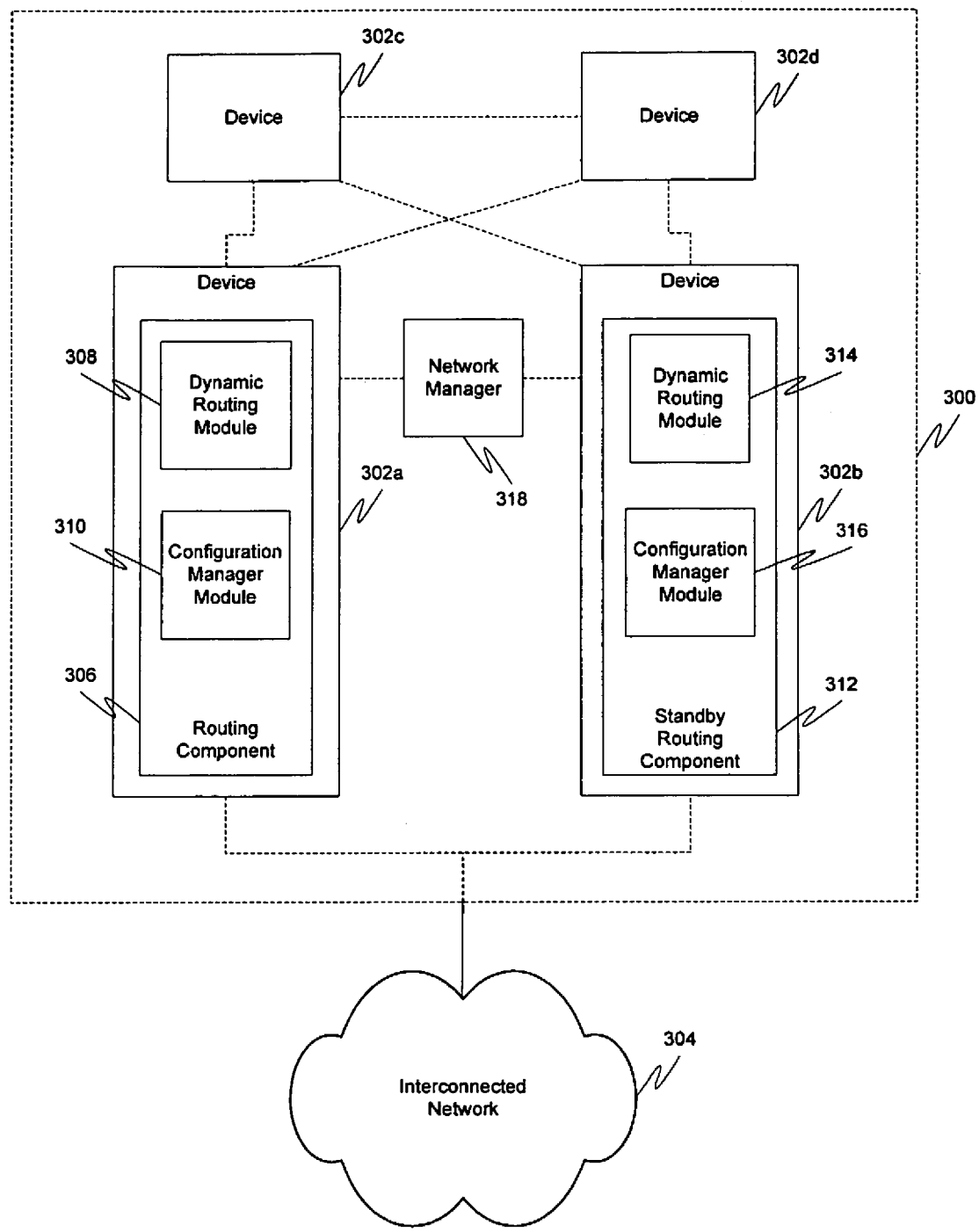
FIG. 3 is a schematic diagram of a network having a cluster of devices serviced with a routing component according to an embodiment of the present invention.

FIG. 3 is a schematic diagram of a network having a cluster of devices serviced with a routing component according to an embodiment of the present invention. Each element in this network may be embodied in software, hardware, or any combination thereof. A cluster 300 contains several network enabled devices 302*a*-*d*. Other devices capable of accessing devices across an electronic network can access services of or data resident on the devices 302*a*-*d* in the cluster 300 through an interconnected network 304. In a typical example, the requests are made and transmitted to the cluster 300 using a network protocol, such as TCP/IP. Of course, networking protocol may occur on several levels, including the application, the presentation, the session, the transport, the network, the data link, and the physical layers. Additionally, many network protocols and/or addressing schemes are available at these levels, and one of ordinary skill in the art will realize that any of these network protocols may be used in the practice of the invention without limitation to the reference above of any particular networking or addressing protocol.

Each of the network enabled devices 302*a*-*d* may be accessed through a single address. Accordingly, a routing component 306 may be placed on a network device 302*a* that is near the "entrance" to the cluster 300 to perform proper routing of messages and/or data to the appropriate device within the cluster 300. The routing component also may perform appropriate routing of messages and/or data emanating from any of the devices 302*a*-*d* to other devices coupled to the interconnected network 304.

In the instance where a single address is used to identify any of the devices 300*a*-*d* within the cluster 300, an incoming message or data packet from the interconnected network 304 may be received at the routing component 306. The routing component 306 can ascertain to which of the devices 304*a*-*d* that the message or data is destined, if any. The routing component 16 may then relay the message to the appropriate device within the cluster 300, or pass it elsewhere.

For an outgoing message, a network device 302*a*-*d* in the cluster 300 may direct the message and/or data to the routing component 304. Upon receiving the outgoing message and/or data, the routing component 304 determines the proper route to send the message based upon the information contained within it.

It should be noted that the devices 302*a*-*d* within the cluster 300 may be in a shared pool of resources, or that the devices 302*a*-*d* within the cluster 300 may represent a load balanced set of resources. In each case, the operation of the routing component 306 operates on the same principle.

It should also be noted that the devices 302*a*-*d* within the cluster 300 may be considered as any network-enabled devices. These type of devices include servers, routers, general purpose computing devices, kiosk-type devices, smart card enabled devices, wireless enabled devices, and the like. Those skilled in the art will realize that many other network devices are possible and can be used in conjunction with the inventive aspect. Additionally, while only four devices are shown, FIG. 3 should be construed as having any arbitrary number of network-enabled devices. Again, those of ordinary skill in that art will realize that any number of network devices may be used in conjunction with the inventive aspects of the presently claimed invention.

When new information regarding routing component connections and other metrics associated with the routing of messages within, to, and from various points in the interconnected network is made available, the routing component 306 can adjust its routing operation to allow for these changes. The routing component 306 may contain a dynamic routing module 308. The dynamic routing module 308 may receive the appropriate routing data for the devices coupled to the interconnected network 304. The dynamic routing module may then recompute any metrics associated with any entries associated with such data. In turn, these actions can lead to a dynamic routing table, in which new data is received, new metrics may be computed, and the routing entries therein updated appropriately.

Additionally, the dynamic routing module 308 can respond to new routing components with which the routing component 306 is placed into contact (e.g., neighboring routing components). In these cases, the dynamic routing module 308 can determine metrics associated with the neighboring routing component, and place the information relating to that routing component and its associated paths in the routing tables for further use.

Typically, the dynamic routing module 308 may be configurable. For example, if the dynamic routing module 308 is an instantiation of an OSPF package, such operational characteristics may be defined from a command line interface. In one embodiment of the present invention, configuration commands may be sent to the dynamic routing module 308 and used to set parameters for the network performance of the dynamic routing module 308. Additionally, the configuration commands may be used to perform numerous functions on the dynamic routing module 308 to delineate and refine the behavior of the dynamic routing module 308. For example, these commands may be used to: create or delete an OSPF area or stub area; to summarize routes at an area boundary; to add or remove an OSPF area's password protection; to enable or disable an OSPF interface; to assign a metric to an interface, to assign a dead interval (i.e., the time that the switch waits to receive a hello packet from a neighboring routing component before the switch declares the neighbor inoperable); to assign a hello time interval (i.e., the time that the switch waits before issuing another hello packet); to specify the priority level that the dynamic routing module 308 uses for an interface when determining a new designated routing component; to set a time between database entry announcements (i.e., link state announcement (LSA)), among many other commands. Those skilled in the art will realize that other configuration commands and settings may be employed to use the tune the performance of the routing component 306 operating the dynamic routing module 308. Further, those skilled in the art will realize that these other configuration settings may be employed in the scope of the invention.

Working in conjunction with the dynamic routing module 308 operating in the routing component 306 is a configuration manager module 310. The configuration manager module 310 may store state information relating to the operational state of the dynamic routing module 308. Additionally, the configuration manager module 310 also may store changes to the configuration of the dynamic routing module 308. Thus, when configuration requests are made to the dynamic routing module 308, the configuration manager module 310 may store the request or a representation of the operating characteristics of the dynamic routing module 308 after application of the configuration request.

In an embodiment of the present invention, configuration settings applied to the dynamic routing module 308 operating in the routing component 306 are relayed to the configuration manager module 310. In this manner, configuration information for the dynamic routing module 308 may be stored through the action of the configuration manager module 310.

In one implementation, the configuration requests are relayed to the configuration manager module 310, which stores the configuration request. In this embodiment the configuration manager module 310 relays the configuration request to the dynamic routing module 308.

In another embodiment of the present invention, the configuration request may be "forked". In this alternative embodiment, the configuration request is sent to both the dynamic routing module 308 and the configuration manager module 316. In yet another alternative embodiment, a messaging portion of the dynamic routing module 308 relays the configuration request to the configuration manager module 310.

When the dynamic routing module 308 receives a configuration request, the dynamic routing module 308 may process and apply the configuration request. Upon processing the configuration request, the dynamic routing module 308 may then alter its behavior or operational characteristics in the requested manner.

If the configuration request somehow fails, the dynamic routing module 308 can relay the failure condition to the configuration manager module 310. In this manner, a failed configuration request is not stored, since the command failed on the operational dynamic routing module 308. Or, in an alternative, the configuration manager module 310 may relay the configuration request to the dynamic routing module 308. Upon an indication that the configuration request was correctly applied, the configuration manager module 310 then may apply the configuration request to the representation of the operational state of the dynamic routing module 308.

Further configuration requests may lead to other changes in the representation of the operating state of the dynamic routing module 308 as maintained by the configuration manager module 310. For example, assume that at some time after starting operation, a new dead time is requested for the dynamic routing module 308. In this manner, the configuration manager module 310 may record the request for a new dead time. At a later time, assume that another dead time is requested. In this manner, the representation of the operational state maintained by the configuration manager module 310 can reflect this new dead time as the operational characteristic of the dynamic routing module 308. This type of configuration tracking may be performed for a wide variety of operational characteristics of the dynamic routing module 308.

The storage of the operational characteristics of the dynamic routing module 308 may be accomplished in a number of ways. A file may be maintained that contains fields relating to various operational characteristics and the application of configuration requests to the characteristics. Alternatively, a record of the configuration requests may be maintained, wherein configuration requests that alter previously executed configuration parameters are overwritten. Alternatively, the configuration requests may be stored in the form of database entries. Those skilled in the art will realize that these methods, among others, can be used to store a representation of the operational state of the dynamic routing module 308.

During operation, the dynamic routing module 308 may operate normally. The routing component 306 may make contact with an assortment of neighboring routing components. Through this interaction, routing tables to other points available on the interconnected network are made available. As changes occur to the routing topology of the coupled network, or as metrics change within the network, the dynamic routing module 308 may make changes to its internal routing data to reflect these changes.

A standby routing component 312 may be located on another of the network devices 302b. During the course of operation, any changes to the routing information may be propagated to the standby routing component 312. The standby routing component 312 may then store and update any routing information associated with the operation of the routing component 306 in conjunction with the traffic to and from the interconnected network 304. In this manner, the standby routing component 312 maintains updated routing information in the operation of the system with respect to the other network devices associated with the interconnected network 304.

The changes to the routing information associated with the standby routing component 312 may be accomplished in a variety of ways. In one embodiment of the present invention, the messages coming into the dynamic routing module 308 can be forked, with one path leading to the standby routing component 312. In another embodiment of the present invention, the dynamic routing module 308 initiates the transfer of information during, before, or after application of the information to its own routing information storage. In any manner, a current or near-current operable copy of the routing information used to interact with other devices through the interconnected network 304 is stored on the standby routing component 312. Thus, the information contained within or accessible to the standby routing component 312 is a current representation of the state of the routing information used by the routing component 306 to communicate to other devices through the interconnected network 304.

Finally, assume that the routing component 306 or that the dynamic routing module 308 stops functioning. Typically, the other devices 302b-d connecting to the device 302a containing the now non-functioning routing component 306 would cease to receive or send information from or to the interconnected network 304. Further, any neighboring routing components coupled to and in contact with the routing component 306 across the interconnected network that send to or receive information from the routing component 306 would detect the non-functioning nature of the routing component 306. Typically, these neighboring routing components would then rebuild their routing tables.

Typically, to rebuild a routing table entails contacting all the routing components about which a particular component knows. This can also entail issuing a signal over the network to those other routing components that may be coupled to the network, and listening for such messages from those other routing components. Upon receiving the associated information, the routing tables can be rebuilt based upon the information that comes back to the routing component that is attempting to rebuild its tables. Thus, a failure condition for a routing component entails a substantial effort for the network routing components, since they need to ensure synchronous information between them.

Further, when the routing component 306 comes back online, it ordinarily has to undergo a synchronization process with the other routing components coupled to it across the interconnected network 304. In this manner, both the neighboring routing components and the routing component 306 may have to undergo substantial expenditure of resources to deal with the change of the network topology due to the downtime, and subsequent uptime, of the routing component 306.

In an embodiment of the present invention, the standby routing component 312 detects the failure condition and initiates a dynamic routing module 314. Upon instantiating the dynamic routing module 314, the standby routing component 312 can serve as a backup routing component for the devices 302a-d in the cluster 300 using the routing information provided by the routing component 306 earlier in the operational cycle.

In an embodiment of the present invention, the standby routing component 312 has a memory media on which is a viable copy of the dynamic routing module 314. Upon determining that the routing component 306 has encountered a situation wherein the routing component 306 cannot perform routing functions for the devices 302a-d in the cluster 300, the standby routing component 312 loads the dynamic routing module 314 into memory, and executes the dynamic routing module 314.

Upon initiating the operation of the dynamic routing module 314, the standby routing component 312 also may determine if any configuration information should be made available to the dynamic routing module 314 and/or applied to the dynamic routing module 314. In an embodiment of the present invention, a configuration manager module 316 is operational on the standby routing component 312. The configuration manager module 316 may have available the necessary information to operate the dynamic routing module 314 in the same configuration that the original dynamic routing module 308 in the routing component 306 was operating under at or near the time that the dynamic routing module 308 ceased functioning.

In an embodiment of the present invention, the information stored by configuration manager module 310 is relayed to the configuration manager module 316. Alternatively, the information stored by the configuration manager module 310 is made available to the configuration manager module 316.

The standby routing component 312 then may apply the configuration information through the interaction of the configuration manager module 310 and the configuration manager module 316 to the instantiation of the dynamic routing module 314 now operating in the standby routing component 312. Thus, the dynamic routing module 314 operating in the standby routing component 312 can be configured at least approximately the same as that of the dynamic routing module 308 operating in the routing component 306 prior to it ceasing to function.

As the dynamic routing module 314 operates in the standby routing component 312, new configuration parameters may be implemented on the operation of the standby routing component 312. Accordingly, the configuration manager module 316 operating in conjunction with the standby routing component 312 can perform the same steps to save the new configuration state change. Thus, when the routing component 306 resumes operation, any new configuration changes in the control state of the dynamic routing module 314 may be applied to the original dynamic routing module 308 when it is restarted on the routing component 306.

In an embodiment of the present invention, the network routing protocol may implement a "hitless restart" feature. In this concept, the routing component 306 may initiate a graceful restart signal. This signal is relayed to one or more neighbors. The neighbors continue to advertise their relationship with the routing component 306 as if the routing component 306 had remained in continuous operation. This means that the neighbors continue to list an adjacency to the routing component 306 over a network segment, regardless of the adjacency's current synchronization state.

To further utilize this feature, the standby routing component 312 may send the "hitless restart" message to appropriate routing components across the network. In this manner, these other routing components need not recalculate and rebroadcast the information to rebuild the various routing databases used in the network topology. In this same manner, the dynamic routing module 314 operating in the standby routing component 312 may begin its operation of directing traffic to and from the devices 302a-d in the cluster 300 without needless overhead impacting the remainder of the routing components accessible across the interconnected network 304. Additionally, minimal impact is made with respect to the operation of the standby routing component 312 as an alternative routing component. It should be noted that the mechanisms described in relation to the functionality described above may be used in terms of a planned cessation of the dynamic routing module 308, or in terms of an unplanned failure of the dynamic routing module 308.

In the planned restart scenario, a network manager 318 may cause the routing component 306 to cease service, and the standby routing component 312 to correspondingly start service to the devices 302a-d in the cluster 300.

At a particular time, the network manager 318 can issue a command to the routing component 306 to halt operation of the dynamic routing module 308. The command may be in the form of an immediate cessation, or to take effect at some predetermined point in time in the future. The predetermined point in time may be a certain point in the future (i.e., February 17, at 6:02 p.m.), an offset (i.e., 20 min. from the command), upon the occurrence of an event (i.e., when an application in a network device fails), or upon an offset to such an occurrence (i.e., 30 secs. after network traffic goes below a predetermined amount.) Concurrently, the network manager 318 can issue a corresponding command to the standby routing component 312 to start the alternative dynamic routing module 314 at a time corresponding to the cessation of operation of the dynamic routing module 308.

A hitless restart may also be initiated to any adjacent routing components across the interconnected network 304 at a corresponding time. The hitless restart may be sent or initiated by the dynamic routing module 308, the dynamic routing module 314, or the network manager 28.

Upon the cessation of operation of the dynamic routing module 308, the standby routing component 312 can start operation in a nearly seamless transition. In this manner, the routing component 306 may be serviced or upgraded upon a specific occurrence or at a specific point in time.

Further, the transition of operation from the routing component 306 to the standby routing component 312 relative to the other routing components across the interconnected network 304 may be accomplished with a near-seamless operation in network traffic flowing to and from the cluster 300. This is due to the characteristic that the neighboring routing components may be aware that some event is occurring, but that the specific event may not necessarily impact the network topology relative to the current information that they have. Also, a transition in the network service of the devices 302a-d in the cluster 300 is accomplished without a resource-consuming rebuild or retransmission of the information relating to the network information on the standby routing component 312.

In terms of the network manager 318, this may be used to allow an even further seamless transition between the dynamic routing module 308 and the dynamic routing module 314. The network manager 318 may be used to effectuate a "last-second" transition of information that could be used by the standby routing component 312 from the dynamic routing module 308. In this manner, the transition between the dynamic routing module 308 and the dynamic routing module 314 is as up to date as possible.

Figure 4:
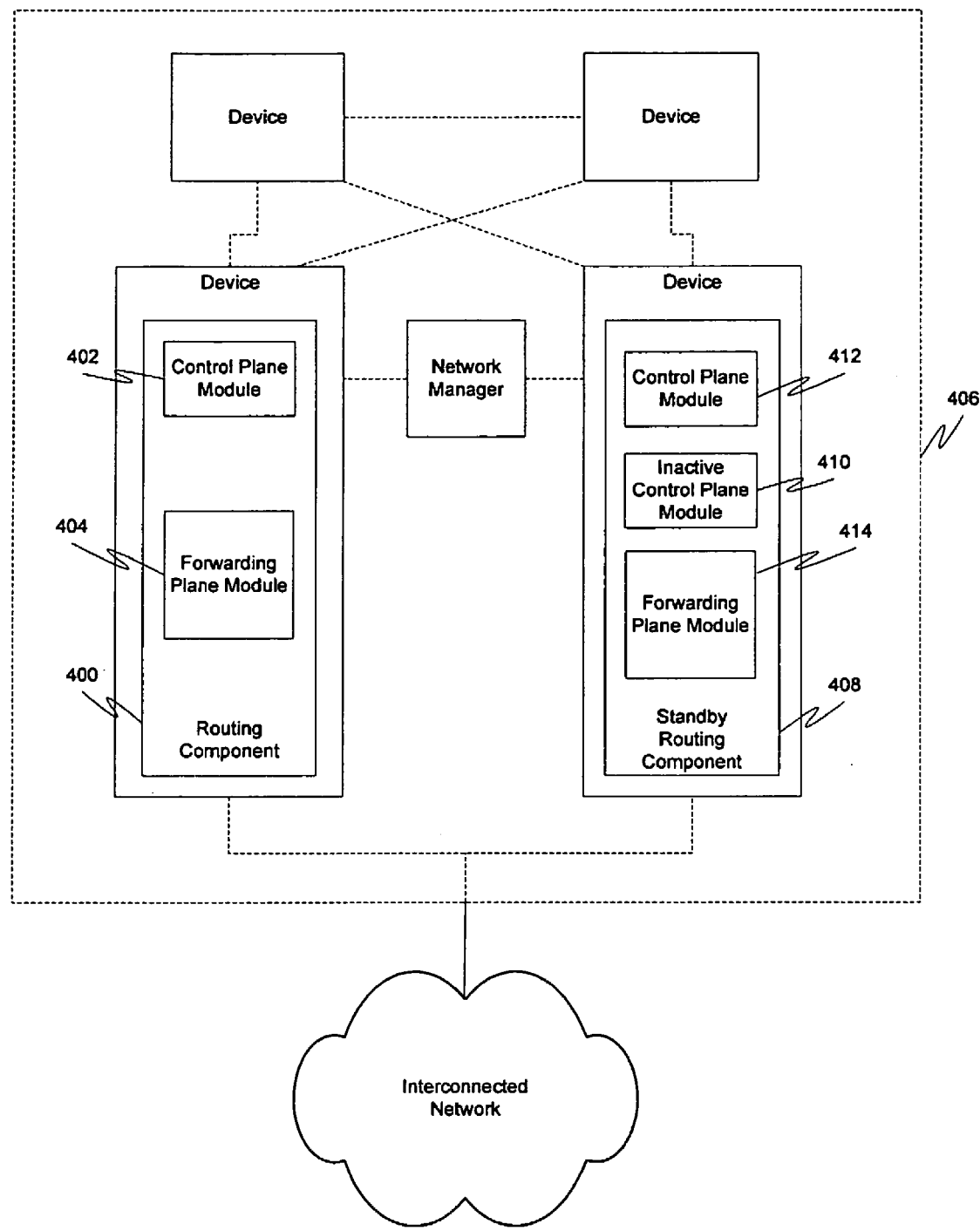
FIG. 4 is a logical-plane view of a network having a cluster of devices serviced with a routing component according to an embodiment of the present invention.

FIG. 4 is a logical-plane view of a network having a cluster of devices serviced with a routing component according to an embodiment of the present invention. Each element in this network may be embodied in software, hardware, or any combination thereof. In most instances, the work of a routing component 400 may be divided into a control plane module 402 and a forwarding plane module 404. The control plane module 402 includes node-related control and management functions, whereas the forwarding plane module 404 performs the per-packet processing of packets passing through the node. Examples of control-plane applications are routing protocols, such as OSPF, and management protocols such as SNMP.

In particular, a routing component 400 is shown performing the routing functions associated with a cluster 406. A standby routing component 408 may be coupled to the routing component 400. The standby routing component 408 has control plane modules 410, 412 and a forwarding plane module 414, as well. The standby routing component 408 can have both an active control plane module 412 and an inactive control plane module 410.

During operation, the routing component 400 may forward information relating to the network characteristics of the forwarding plane module 404 to the standby routing component 408, which in turn, communicates the network information to the forwarding plane module 414. Accordingly, a closely updated, if not fully updated, copy of the information relating to the forwarding plane associated with the routing component 400 is maintained separately from the routing component 400.

Further, information regarding the control plane module 402 may be relayed to the standby routing component 408. The standby routing component 408, or possibly another remote device, can maintain the control plane information relating to the operational characteristics of the control plane module 402 in the routing component 400. To save overhead, the control plane module 412 in the standby routing component 408 can be maintained in an inactive state 410, such as residing on a hard drive, but not loaded into memory for execution.

One of ordinary skill in the art will recognize that either of the active control plane module 412 or the inactive control plane module 410 may be made up of several executable modules. In the standby routing component 408, none, some, or all of the control plane modules may be executing at the time of the failover event. Accordingly, at the failover event, whether planned or unplanned, the remaining modules that comprise a fully functional control plane can be executed in the standby routing component.

Additionally, those skilled in the art will realize that other dynamically configurable and operable routing systems may be used in various forums. Those skilled in the art will realize that the disclosure is not limited to OSPF, but includes those other dynamically configurable routing systems as well. In this vein, the hitless restart for OSPF to signal the network to continue forwarding packets to the cluster may not be required (or available) for other types of protocols. Additionally, the secondary function of the hitless restart (i.e., the functionality inhibiting the rebuild of the internal data representation of the network due to the failure of a single component) may also be implemented in current or future routing modules, or in extensions to other dynamic routing modules. Other equivalent functional features might be available in such other routing protocols to perform an equivalent operation in, or may contain this type of feature in future enhancements to such protocols.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A routing component located on a first network device in a cluster of network devices, the routing component comprising:
   a dynamic routing module;
   a configuration manager configured to store configuration information associated with operational characteristics of a second dynamic routing module associated a second routing component located on a second network device in the cluster, the cluster comprising a plurality of network devices configured to operate in parallel, the second network device configured to communicate with neighboring devices outside the cluster using a cluster address when the second dynamic routing module is operating, the cluster address identifying any of the plurality of network devices within the cluster;
   a network information module, configured to store routing information from the second routing component;
   a communication module configured to transmit a graceful/hitless restart event based upon an event associated with the execution of the dynamic routing module;
   wherein the dynamic routing module is configured to execute upon an indication that the second dynamic routing module is no longer operating;
   wherein the first network device is configured to communicate with the neighboring devices outside the cluster using the cluster address when the dynamic routing module is operating; and
   wherein the dynamic routing module is further configured to operate according to the configuration information.

2. The routing component of claim 1 wherein the dynamic routing module implements an OSPF routing protocol.

3. A routing component located on a first network device in a cluster of network devices, the routing component comprising:
   a control plane comprising:
     a dynamic routing module configured to determine a routing path for network data; and
     one or more control plane executable modules associated with controlling the operational characteristics of a routing function;
   a forwarding plane comprising:
     a routing information module; and
     one or more forwarding plane executable modules associated with forwarding packets to or from a network according to routing information;
   a configuration manager configured to store configuration information associated with operational characteristics of a second dynamic routing module associated a second routing component located on a second network device in the cluster, the cluster comprising a plurality of network devices configured to operate in parallel, the second network device configured to communicate with neighboring devices outside the cluster using a cluster address when the second dynamic routing module is operating, the cluster address identifying any of the plurality of network devices within the cluster;
   a communication module configured to transmit a graceful/hitless restart event based upon an event associated with the execution of the dynamic routing module;
   a network information module, configured to store routing information from the second routing component;
   wherein the dynamic routing module is configured to execute upon an indication that the second dynamic routing module is no longer operating;
   wherein the first network device is configured to communicate with the neighboring devices outside the cluster using the cluster address when the dynamic routing module is operating; and
   wherein the dynamic routing module is further configured to operate according to the configuration information.

4. A routing component located on a first network device in a cluster of network devices, the routing component comprising:
   a dynamic routing module;
   a configuration manager configured to store configuration information associated with operational characteristics of a second dynamic routing module associated a second routing component located on a second network device in the cluster, the cluster comprising a plurality of network devices configured to operate in parallel, the second network device configured to communicate with neighboring devices outside the cluster using a cluster address when the second dynamic routing module is operating, the cluster address identifying any of the plurality of network devices within the cluster;
   a network information module, configured to store routing information from the second routing component;
   a communication module configured to receive a reply from another routing component, the reply being responsive to the receipt of a graceful/hitless restart by the another routing component;
   wherein the dynamic routing module is configured to execute upon an indication that the second dynamic routing module is no longer operating;
   wherein the first network device is configured to communicate with the neighboring devices outside the cluster using the cluster address when the dynamic routing module is operating; and
   wherein the dynamic routing module is further configured to operate according to the configuration information.

5. A routing component located on a first network device in a cluster of network devices, the routing component comprising:
   a control plane comprising:
     a dynamic routing module configured to determine a routing path for network data; and
     one or more control plane executable modules associated with controlling the operational characteristics of a routing function;
   a forwarding plane comprising:
     a routing information module; and
     one or more forwarding plane executable modules associated with forwarding packets to or from a network according to routing information;
   a configuration manager configured to store configuration information associated with operational characteristics of a second dynamic routing module associated a second routing component located on a second network device in the cluster, the cluster comprising a plurality of network devices configured to operate in parallel, the second network device configured to communicate with neighboring devices outside the cluster using a cluster address when the second dynamic routing module is operating, the cluster address identifying any of the plurality of network devices within the cluster;
   a communication module configured to receive a reply from another routing component, the reply being responsive to the receipt of a graceful/hitless restart by the another routing component;

a network information module, configured to store routing information from the second routing component;

wherein the dynamic routing module is configured to execute upon an indication that the second dynamic routing module is no longer operating;

wherein the first network device is configured to communicate with the neighboring devices outside the cluster using the cluster address when the dynamic routing module is operating; and wherein the dynamic routing module is further configured to operate according to the configuration information.

* * * * *